Jan. 25, 1955

A. L. SPRECKER 2,700,271

SYNCHRONOUS MOTOR CONTROLLED SECONDARY
CLOCK SYNCHRONIZING DEVICE

Filed Dec. 23, 1952

INVENTOR
ALFRED L. SPRECKER

BY
G. R. Gugger
AGENT

Jan. 25, 1955

A. L. SPRECKER 2,700,271

SYNCHRONOUS MOTOR CONTROLLED SECONDARY
CLOCK SYNCHRONIZING DEVICE

Filed Dec. 23, 1952

INVENTOR
ALFRED L. SPRECKER

BY

AGENT

United States Patent Office 2,700,271
Patented Jan. 25, 1955

2,700,271

SYNCHRONOUS MOTOR CONTROLLED SECONDARY CLOCK SYNCHRONIZING DEVICE

Alfred L. Sprecker, Paramus, N. J., assignor to International Business Machines Corporation, New York, N. Y., a corporation of New York Application December 23, 1952, Serial No. 327,633

3 Claims. (Cl. 58—34)

The present invention relates to timekeeping apparatus and, more particularly, to secondary clocks and similar timekeeping units of the type normally driven by individual driving motors, as for example, synchronous alternating current motors which are automatically regulated at selected intervals in response to time signals transmitted from a source of correct or standard time. The invention is designed as an improvement over the structure shown and described in Patent 2,569,815 to C. E. Larrabee which was issued on October 2, 1951.

In the patent above referred to the clock mechanism is adapted to be uniformly and continuously driven by means of a synchronous alternating current motor which receives its impulses from the commercial 60-cycle power line. Means are also provided whereby an electrical signal is transmitted to the secondary clock over the regular power line at a moment which occurs slightly before the fifty-ninth minute of each standard time hour and which terminates at the fifty-ninth minute of the hour, such an impulse serving to initiate a correction cycle whereby, if the secondary clock is running slow with respect to standard time at the fifty-ninth minute of the hour, it will be brought up to the correct time during the sixtieth minute of the hour so that when the sixtieth minute is completed and the first minute of the next succeeding hour commences, the clock will be accurately synchronized with the standard time source.

The special or time correcting signal which is imparted to the secondary clock over the regular commercial channel is preferably of a high frequency nature and it is generally employed to energize a magnet which, by tripping a latch, initiates the correction cycle. In the structure of the above mentioned patent the energization of the magnet unlatches a normally idle correction disc allowing said disc to be driven by suitable driving means at the rate of one revolution per minute. Means are provided to couple said correction disc during the correction cycle to a second correction disc normally rotating at the rate of one revolution per hour and connected to the drive of the minutes hand. If the clock had been running slow, the initiation of the correction cycle and coupling together of the two correction discs will allow the first correction disc to drive the second correction disc at a rapid rate so that at the end of the correction cycle the lost time will have been made up and the minute hand will be on the even hour position occurring at the zenith of the clock dial. A detent arm is provided having a roller which rides the periphery of the first mentioned correction disc for the purpose of positioning the second hand in an even minute position so that both the second and minute hands may start off together at the end of the correction cycle. The roller of the detent arm is also adapted to seat in a semicircular notch in the periphery of the first mentioned correction disc precisely at the end of the correction cycle when said correction disc is unlatched from its driving means and serves to detent this disc in position during the normal operation of the clock.

It has been found that due to the shape of the roller and semicircular notch, when the roller engages the notch at the end of a correction cycle the roller in the process of seating drives the first correction disc forward a slight amount and that this forward movement is transmitted through the second correction disc to the minute hand. As a result, after several correction cycles, it may be noticed that the minute hand will have crept forward and will not be positioned at the zenith of the clock dial.

The present invention is designed to overcome the above noted condition that is attendant upon the use of secondary clocks such as are disclosed in the above mentioned patent and, toward this end, it contemplates the provision of an improved latching means for the first correction disc and an improved means for detenting said disc at the end of a correction cycle so that it will be accurately detented without transmitting any motion to the minute hand thereby eliminating any creep of the minute hand.

In carrying out the above mentioned object, cognizance is taken of the fact that the detent mechanism of the patented structure possesses a pressure angle which results in the undesired additional movement of the correction disc. Thus, in carrying out the principles of the invention, a detenting structure is provided which has a zero pressure angle with respect to the disc and therefore the detenting structure cannot impart any rotary movement to the disc.

A still further object of the invention is to provide a secondary timekeeping apparatus of the type set forth in the above mentioned patent in which means are provided for driving the seconds hand at a rate of one and one-sixtieth revolutions per minute with means for stopping the seconds hand at least once each minute and then instantaneously releasing it for continued rotation. This feature has definite utility in a radio or television studio clock system where it is particularly desired to have the seconds hands of the clocks synchronized so that accurate switching of programs may be accomplished. In many studio installations it has been found that due to irregularities of commercial 60-cycle power the clocks may vary as much as seven seconds in one hour. With the present feature this condition is avoided by correcting the seconds hands of the clocks once each minute.

A still further object of this invention is the provision of an adjustable time delay means whereby transient or stray frequencies encountered haphazardly during the middle of an hour will have no effect upon the initiation of the correction cycle.

Other objects of the invention will be pointed out in the following description and claims and illustrated in the accompanying drawings, which disclose, by way of example, the principle of the invention and the best mode, which as been contemplated, of applying that principle.

Figure 1:
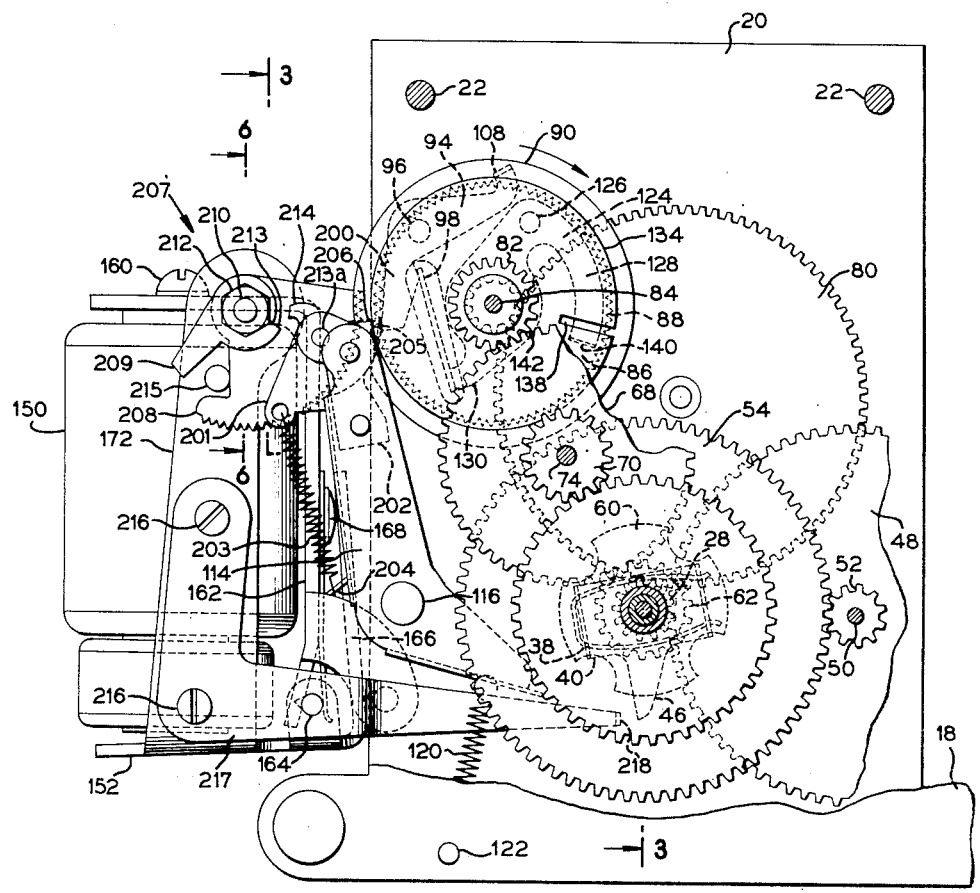
Fig. 1 is a front elevational view of a secondary clock mechanism constructed in accordance with the principles of the present invention. In this view, the dial face, clock hands, clock casing and other parts have been removed to more clearly reveal the nature of the invention.

In all of the above-described views where structural elements of the previously mentioned patent are shown, these elements have been given the same reference characters as they received in said patent and the reference characters of the novel elements of the present invention will commerce with the numeral 200.

Referring now in detail to the drawings wherein a preferred form of an automatically regulated secondary clock construction is shown, the clock comprises the usual face plate or dial face 10, seconds hand 12, minutes hand 14 and hours hand 16. The parallel front and rear support plates are indicated at 18 and 20, respectively, and they are suitably secured in their predetermined spaced relationship by pillars 22. An electric driving motor M is suitably supported, as for example, by means of screws 24, on the rear plate 20 and is preferably of the self-starting synchronous type which is adapted to be driven at a predetermined time rate from the available frequency regulated commercial alternating current power line.

The output shaft 26 of the motor M has mounted thereon a relatively wide splined pinion 28 which, when the motor is assembled on the rear plate 20, fits into and meshes with an internally threaded cup-shapd gear 30 rotatably mounted on a seconds shaft 32, the latter being rotatably supported in the front and rear plates 18, 20. The gear 30 is formed with an external circumferential groove 34 therein and a substantially U-shaped spring clip or friction member 36 has its opposite arms straddling the groove 34 and bearing frictionally inwardly against the surface of the groove. The opposite ends of the friction member 36 project through openings 38 formed in a frame or cage member 40 which has integrally formed thereon a gear portion 42 which is pinned as at 44 to the seconds shaft 32. The motor shaft 26 is adapted to be rotated when the motor M is energized at the rate of one and one-sixtieth revolutions per minute and, as a consequence, the pinion 28 imparts motion to the cup-shaped gear 30 which in turn frictionally drives the frame member 40 and its gear portion 42, together with the shaft 32 at a corresponding rate of one and one-sixtieth revolutions per minute. The friction drive, including the gear 30, friction spring 36 and frame member 40, permits relative movement between the seconds shaft 32 and the pinion 28 when such relative movement is required for time-correcting operations, as will be subsequently described.

Formed as an integral part of the frame-like member 40 is an outwardly extending seconds stop arm 46. The seconds hand 12 is mounted upon the forward end of the seconds shaft 32. Thus, the stop arm 46 and seconds hand 12 move together with the seconds shaft 32, and the stop arm 46 thus occupies a definite angular position with respect to the seconds hand 12 for any given time-indicating position of the latter.

The gear portion 42 of the frame-like member 40, which may be considered as the seconds driving gear of the clock works, is in mesh with a large gear 48 (Fig. 1) mounted on a shaft 50 extending between the front and rear plates 18, 20 of the clock works mechanism. The shaft 50 carries a small gear 52 which meshes with a large gear 54 rotatably mounted on the seconds shaft 32. A friction member designated in its entirety at 56 is in the form of a disc-like element having a flat hub portion 58 from which there project radially a series of bowed spring fingers 60 which bear against the front face of the gear 54, thus normally forcing the central or hub portion 58 of the friction ring 56 to the right, as viewed in Fig. 3, and causing the same to bear against a minutes driving gear 62 fixedly secured on a minutes sleeve 64 surrounding the seconds shaft 32 and in which the latter is rotatably journaled. The minutes sleeve 64 carries the minutes hand 14 at its forward end which terminates short of the seconds shaft 32. The gears 42, 48, 52 and 54 are so designed as to frictionally drive the minutes sleeve 64 from the seconds shaft 32 through the friction member 56 at the proper time rate of one revolution per hour. The friction member 56 between the gear 54 and the gear 62 permits relative motion between the constantly rotating seconds driving gear 42 and the minutes driving gear 62 when necessary during the time-correcting cycle or period, as will appear presently.

An hours sleeve 66 is rotatably mounted on the minutes sleeve 64 and is driven at the proper time rate of one revolution every twelve hours by gearing including a large gear 68 which meshes with the minutes driving gear 62 and a small gear 70 which meshes with the relatively large hours driving gear 72 carried on the hours sleeve 66. The gears 68 and 70 are carried on a common stub shaft 74 secured in the front plate 18. The hours hand 16 is mounted on the forward end of the hours sleeve 66 which terminates short of the minutes sleeve 64.

Figure 3:
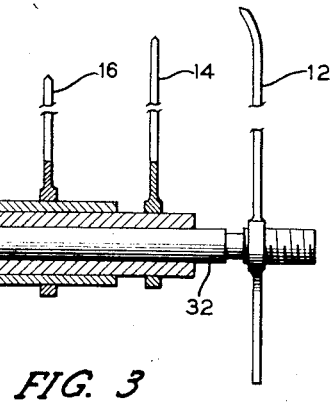
Fig. 3 is an enlarged sectional view taken substantially along the line 3—3 of Fig. 1. In this view the clock dial face and indicating hands have been applied to the clock.

Referring now particularly to Figs. 1 and 3, the pinion 28, in addition to driving the cup-shaped gear 30, as previously described, meshes with and drives a relatively large gear 80 journaled on the rear plate 20. The gear 80 in turn meshes with a small gear 82 fixedly mounted on a countershaft 84 extending across the clock works and rotatably journaled in the front and rear plates 18 and 20, respectively. A relatively large toothed disc 86 having a hub portion 87 formed thereon is fixedly secured to the shaft 84 and the teeth 88 on the periphery of the disc 86 are relatively small and closely spaced to effect a tractional function in connection with the time delay mechanism, which will be made clear presently. It should be borne in mind at this point that the pinion 28 and gears 80 and 82 remain in constant rotation at all times while the motor M is energized and these gears are so designed that the countershaft 84 and toothed disc 86, together with its hub 87, are adapted to rotate continuously at the rate of one and one-sixtieth revolutions per minute.

The toothed disc 86 is adapted to impart its relatively fast rate of rotation to a time-correcting disc 90 which is loosely mounted on the constantly rotating countershaft 84 forwardly of the disc 86 and which is maintained axially spaced from the latter by means of the previously mentioned hub 87. This time-correcting disc is normally held against rotation at a predetermined angular position by means of a latch arm 200 of a pivoted clutch piece 94 which is pivotally secured as at 96 to a rear face of the time-correcting disc 90. The clutch piece 94 is spring-pressed as at 98 in such a manner as to normally bias the same in a clockwise direction, as viewed in Fig. 1. The latch arm 200 normally bears against a clutch release pawl 201 pivoted on a follower arm 202 which is fastened to a detent lever 114. The clutch release pawl is normally biased in a counterclockwise direction by a spring 203 which extends between the pawl and an outwardly bent lip 204 of the detent lever 114.

The clutch piece 94 is formed with a laterally and rearwardly turned clutch tooth 108 designed for tractional engagement with the periphery of the toothed disc 86 when clutch piece 94 is released by the clutch release pawl 201. Normally, with the latch arm 200 bearing against the clutch release pawl 201, the clutch piece 94 is urged in a counterclockwise direction, as viewed in Fig. 1, against the action of the spring 98 to cause the clutch tooth 108 to disengage the toothed periphery 88 of the constantly rotating traction disc 86 so that the correction disc 90 is forcibly held or latched against rotation. However, as will be seen presently, when the clutch release pawl 201 is tripped or swung in a clockwise direction the clutch piece 94 is released and allowed to rotate clockwise effecting a tractional engagement between the correction disc 90 and the toothed disc 86 so that these two elements will then rotate in unison uniformly throughout one complete revolution during the course of one minute. Such rotation in unison occurs only during the correction cycle which commences on the fifty-eighth minute of each hour and which terminates precisely at the fifty-ninth minute.

The disc 90 is provided with a notch or V-shaped recess 205 in the periphery thereof adapted to receive therein the nose portion 206 of the follower arm 202 which is attached to the detent lever 114. The detent lever 114 is pivoted medially of its ends on a rod 116 extending between the front and rear plates 18, 20. A coil spring 120 which is anchored at one end to a stud 122 carried on the front plate 18 has its other end secured to the detent lever 114 and normally biases this lever in a clockwise direction, as viewed in Fig. 1, to maintain the nose 206 in tractional engagement with the periphery of the correction disc 90 during the correction cycle and to maintain this nose within the recess 205 at all other times.

Secured to the forward face of the correction disc 90 is a pickup spring piece 124 of irregular design which is riveted or otherwise secured as at 126 to the disc. The spring piece 124 includes an arcuate forward and outward extending spring pickup arm 128 and a rearwardly extending portion 130 which projects through an opening 132 formed in the disc and which on the rear side of the disc is provided with a lateral extension that constitutes the spring 98 which serves to bias the pivoted clutch piece 94.

Spaced from the correction disc 90 and forwardly thereof is a second correction disc 134 which is loosely mounted on the countershaft 84. The second correction disc 134 is formed with a radially extending slot 138 which extends inwardly a slight distance from the periphery thereof and which is designed to cooperate with an out-turned end 140 provided on the arcuate spring pickup arm 128. The distance between the plane of the two correction discs 90 and 134 and the reach of the spring arm 124 is such that the out-turned end 140 of this arm is adapted to frictionally bear against the rear surface of the second correction disc 134 at all times during normal operation of the clock when the latter is correct or on time and during a varying portion of each correction cycle when the latter is effective to perform a correcting function. At other times during the correction cycle the out-turned end 140 of the spring arm 128 is adapted to enter slot 138 in the correction disc 134 and abut against one edge of this slot to impel the disc rotatably for time-correcting purposes in a manner that will appear presently. The spring arm 128 and slot 138 comprise the two coacting parts of a one-way coupling between the two correction discs 90 and 134.

The correction disc 134 has secured to, and is consequently rotatable with, a relatively small gear 142 which meshes with the relatively large gear 68 that in turn meshes wtih the minutes driving gear 62. It will be seen, that, since gears 62 and 142 have a like number of teeth, the disc 134 rotates freely on the countershaft 84 at the same rate as the sleeve 64 and hand 14; that is, at a rate of one revolution per hour, while the disc 90 is maintained normally stationary. The angular position of the slot 138 therefore bears a definite relationship to the angular position of the minutes hand 14.

It has been seen how the toothed disc 86 is adapted to be positively continuously rotated at the rate of one and one-sixtieth revolutions per minute as long as the motor M remains energized. It has also been seen how the correction disc 134 is adapted to be continuously rotated by a friction drive at the rate of one revolution per hour as long as the motor M is energized and the clock is on time. Even if the clock is running slow with respect to chronological time, the second correction disc 134 is adapted to be driven at the rate of one revolution per hour and its speed will not be increased until such time as the two correction discs are coupled and motion is applied to the disc 134 from the disc 90. For practical purposes, then, and for purposes of terminology in the accompanying claims, the toothed disc 86 may be regarded as a seconds member of the clock system and the correction disc 134 may be regarded as a minutes member of this system. In this regard, the seconds member or disc 86 is not to be confused with the seconds driving gear, which is the gear portion 42 of the frame 40, nor is the minutes member to be confused with the minutes driving gear 62.

Figure 4:
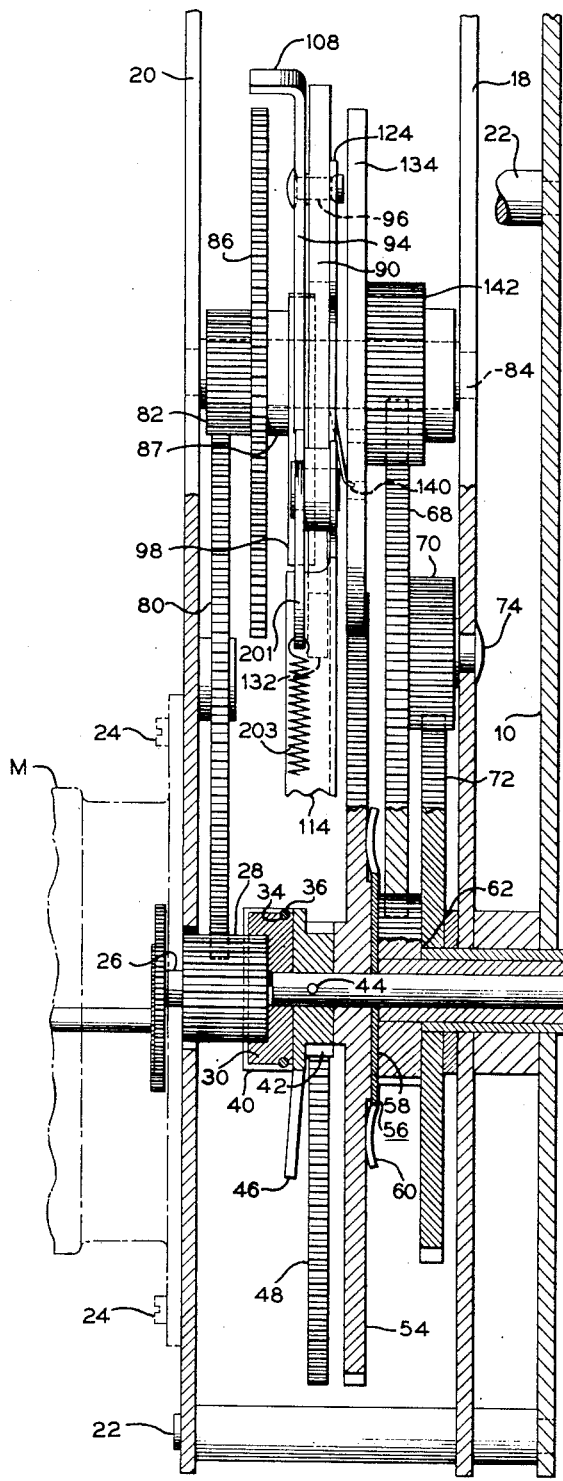
Fig. 4 is a schematic view showing the relationship between a pair of correction discs employed in connection with the present invention when the minute and hour hands of the clock are positioned to represent approximately five seconds before the fifty-eighth minute of any particular hour, with the clock on time.
Figure 4:
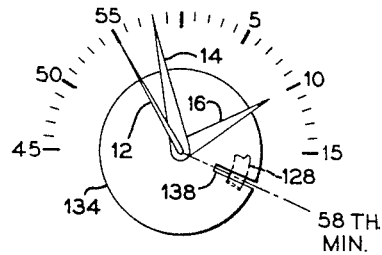
Figure 5:
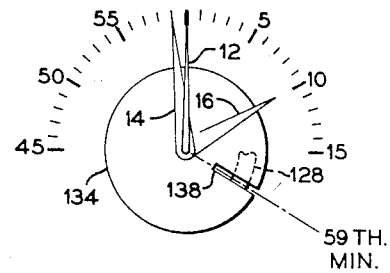
Fig. 5 is a schematic view, similar to Fig. 4, showing the relationship between the correction discs when the minute and hour hands are on the fifty-ninth minute of any particular hour and the clock is either normally on time or has just been brought to correct time at the end of a correction cycle.

In Fig. 1 the spring arm 128 and slot 138 are in the position they occupy at a chronological time of approximately five seconds before the fifty-eighth minute of any particular hour with the clock running on time. As was previously mentioned, in the present case the correction cycle commences slightly before the fifty-eighth minute and terminates precisely at the fifty-ninth minute whereas in the clock described in the aforementioned patent, No. 2,569,815, the correction cycle commences slightly before the fifty-ninth minute and terminates precisely at the sixtieth minute. This relationship is further illustrated schematically in Fig. 4. In Fig. 5 the relationship between the spring arm and slot is illustrated at the fifty-ninth minute of any particular chronological hour with the clock running on time or at the end of a correction cycle whether the clock has previously been on time or slow.

It has been explained previously that at the fifty-eighth minute after each chronological hour, the clutch release pawl 201 is adapted to become tripped to release latch arm 200 of the clutch element 94 to permit the correction disc 90 to commence its cycle of rotation, during which it rotates one complete revolution and is stopped at the fifty-ninth minute of the hour. Tripping of the release pawl 201 is effected under the control of an electromagnet 150 which, upon energization thereof, attracts its armature 152 (Fig. 1) and sets into action an improved time delay mechanism designated in its entirety at 207, the nature of which will be explained fully hereinafter. From the instant of energization of the magnet 150 until the instant of tripping of the release pawl 201, a period of approximately five seconds intervenes for the purpose of preventing stray or transient frequencies coming over the power line and of a shorter duration than five seconds from affecting the release pawl 201. Actually then, the energizing signal, which is of such high frequency as to not disturb the normal functions of the 60-cycle current frequency constantly issuing over the line, is applied to the magnet approximately five seconds before the commencement of the fifty-eighth minute after each chronological hour but the clutch release pawl 201 is not tripped until approximately the commencement of the fifty-eighth minute after the chronological hour.

Figure 8:
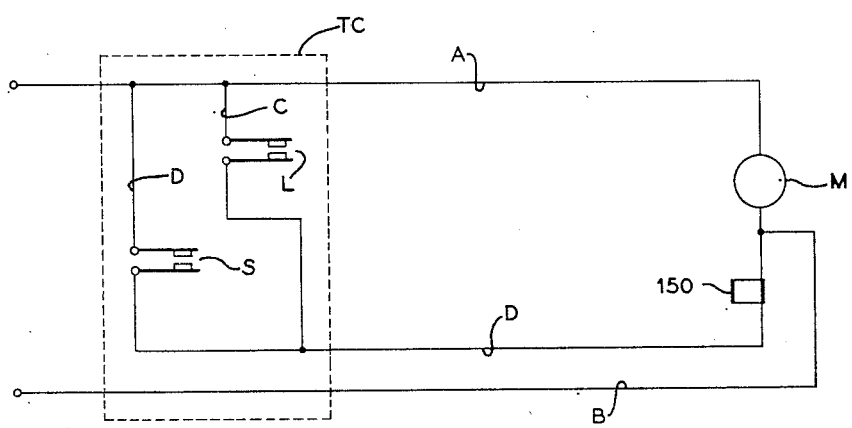
Fig. 8 is a simplified wiring diagram showing one method of supplying time signals to the secondary clock.

To simplify the present case there is shown in Fig. 8 a simplified circuit for impulsing the electromagnet 150 to control the secondary clock in accordance with the present invention. It is to be understood that the arrangement shown in Fig. 8 is meant to be merely illustrative of one manner by which time control pulses may be provided and that other means could be used such as, for example, the one disclosed in U. S. Patent 2,610,241, to R. N. Eichorn, entitled "Signal Voltage Regulator for Power Line High-Frequency Transmitters."

Referring to Fig. 8, there is shown a master time control device TC which may be the conventional type of master clock which is used to regulate time indicating clocks. Such a master clock is shown in U. S. Patent 1,878,931, to C. E. Larrabee which may be referred to for complete details of operation. It will suffice here to say that such master clocks are equipped with certain contacts cooperating with the clock movements whereby impulses are transmitted to the secondary clocks at regular periods of time for the purpose of driving the secondary clocks and also at predetermined intervals of time for effecting synchronization of any of the secondary clocks which may be fast or slow with respect to the master clock. Such synchronization and impulse contacts are commonly actuated by cams driven by the gearing of the clock train of the master clock as shown in said Patent 1,878,931.

The synchronous motor M of the secondary clock is shown connected for operation across the alternating current power lines A and B. The electromagnet 150 is shown connected between the lines A, B, in parallel-series relationship with a pair of normally open cam contacts in the master clock designated as L and S. Contacts L are closed by the master clock at five seconds before the commencement of the fifty-eighth minute after each chronological hour and transmit a long pulse from line A, wire C, contacts L, wire D, electromagnet 150 and line B. This long pulse is of a predetermined duration sufficient to cause the electromagnet 150 to effect the release of clutch pawl 201 to initiate a correction cycle. The contacts S are closed by the master clock at the end of each minute of a standard time hour and transmit a short pulse from line A, wire D, contacts S, electromagnet 150 and line B. This short pulse is of a duration which is insufficient to cause electromagnet 150 to release clutch pawl 150 but is long enough to effect the synchronization of the seconds hand of the secondary clock in a manner to be later described.

Fig. 1 shows the normal position of the various parts of the clock works and of the two correction discs 90, 134 at approximately five seconds before the fifty-eighth minute of any particular chronological hour. It will be remembered that the disc 134, having the slot 138, is being constantly rotated in a clockwise direction, as viewed in this figure, at a rate of one revolution per hour. At the fifty-eighth minute after the hour when the release pawl 201 is tripped, the latch arm 200 is released and the disc 90 commences to rotate in a clockwise direction at a rate of one and one-sixtieth revolutions per minute. The end of the spring piece 124 thus walks rapidly away from the slot 138 and continues to rotate at its relatively rapid rate for one complete minute existing from the commencement of the fifty-eighth minute after the hour and ending at the end of the fifty-eighth minute. By the time the spring has swept through an arc of 360° the slot 138 has advanced throughout an arc of one-sixtieth of a revolution or 6°. Thus, when the latch arm 200 again encounters the restored release pawl 201, the end of spring arm 128 will have entered the slot 138 which, by that time, has been advanced throughout an angle of 6°. As soon as the latch arm 200 engages the nose of the release pawl 201, the slot 138 will commence to walk away from the end of the spring arm 128 as the fifty-ninth minute commences.

Figure 2:
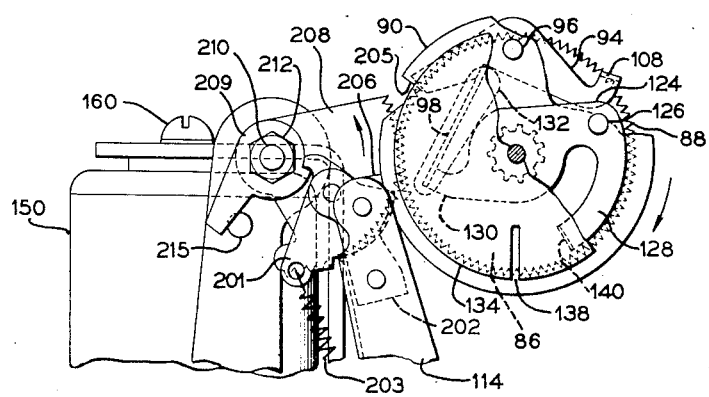
Fig. 2 is a similar fragmentary view of the secondary clock with the parts thereof shown in a selected position to illustrate the operation of the mechanism.

If the clock happens to be running slow, as for example, by approximately fifty minutes at the fifty-eighth minute after a particular chronological hour, the relationship of the two correction discs will be such that the slot 138 will occupy a position approximately 60° in advance of the end of the spring 124. When the release pawl 201 is tripped and the disc 90 commences to rotate at a rate of one and one-sixtieth revolutions per minute, as shown in Fig. 2, the end of spring 124 will shortly overtake the slot 138, engage the receding edge thereof and impel the disc 134 throughout the proper angle to cause the minutes hand 14 to arrive at its proper position precisely at the end of the fifty-eighth minute, the driving connection during such correction time existing from the disc 134 through the gears 142, 68, 62 and sleeve 64 to the minutes hand 14.

The previously mentioned time delay mechanism 207, whereby reception of a high frequency signal over the commercial power line by the electromagnet 150 at approximately five seconds before the fifth-eighth minute of each hour will not effect tripping of the release pawl 201 until five seconds later, is shown in Fig. 1 in the normal position which it assumes throughout the first fifty-seven minutes of each hour. As was previously mentioned, a principal object of the present invention is to provide an improved time delay mechanism which will be quick acting upon release and which will assure positive positioning of the minute hand whenever a reset cycle is taken. It is also desired to provide a time delay mechanism which may be adjusted to provide time delays of different duration when resetting a clock of the class described. This is a desirable feature since it is necessary to compensate for varying degrees of transient frequency interferences inherent in the power lines which supply power to such clock systems.

The electromagnet 150 is secured as at 160 in a bracket 162 which, in turn, is secured to the rear plate 20 of the clock works. The armature 152 of the magnet 150 is pivoted on a pair of trunnions 164 which projects laterally from the lower end of the bracket 162 and is provided with an upwardly extending stop arm 166 designed for engagement with a limit stop 168 carried on the bracket 162 when the armature is de-energized.

Figure 6:
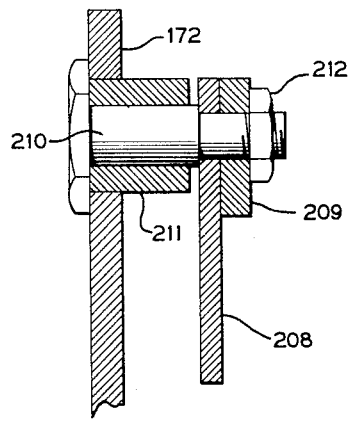
Fig. 6 is an enlarged sectional view taken on line 6—6 of Fig. 1 showing the adjustable time delay means.
Figure 7:
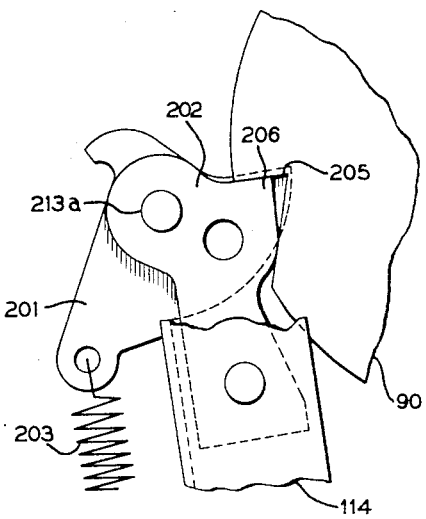
Fig. 7 is an enlarged view of the sector and time delay can assembly.

The actuating arm 172 is secured to the armature 152 and extends upwardly therefrom along one side of the magnet 150. A toothed sector 208 and a time delay cam 209 are mounted on a shouldered stud 210 which in turn is freely mounted in a bushing 211 at the upper end of the actuating arm 172 as shown in Fig. 6. A lock nut 212 is screwed onto a threaded portion of the stud clamping the sector and cam together up against the shoulder on the stud so that they may be pivoted in unison along with the stud. The toothed sector 208 is designed for engagement with the teeth 88 on the periphery of the continuously revolving disc 86 but in the normal position, as shown in Fig. 1, the sector is out of engagement with said disc. When magnet 150 is energized and armature 152 is attracted so as to throw the upper end of actuating arm 172 in a clockwise direction, the toothed portion of the toothed sector 208 engages the toothed periphery of disc 86 as shown in Fig. 2. Since disc 86 is rotating clockwise, the engagement of the toothed sector 208 with disc 86 causes said sector to rotate counterclockwise with stud 210.

The angular relationship of the time delay cam 209 with the toothed sector 208 determines the time required to release the clutch release pawl 201. As toothed sector 208 and time delay cam 209 rotate in unison, in a counterclockwise direction, the outwardly extending portion 213 of the cam engages an ear 214 on the release pawl 201 rotating it clockwise about its pivot point 213a. As clutch release pawl 201 rotates clockwise a latching shoulder thereon, which is directly behind the nose 206 of follower arm 202 and which is of the same shape as the nose 206, is moved away from the latch arm 200 of the clutch piece 94. Since clutch piece 94 is biased clockwise around pivot point 96, clutch tooth 108 engages the toothed periphery of correction disc 86 and a correction cycle is initiated. As presently arranged, five seconds will elapse from the time that magnet 150 is energized to start sector 208 rotating until the outwardly extending portion 213 of the cam strikes the release pawl and engages clutch piece 94 with disc 86 to start the correction cycle. It can be readily seen that this time delay may be varied merely by loosening the lock nut 212 and changing the angular relationship between the time delay cam 209 and the toothed sector 208.

When the de-energization of magnet 150 occurs, five seconds after it was energized in the present case, the armature 172 under the influence of gravity is restored to its initial position and the toothed sector 208 moves out of engagement with toothed disc 86. The toothed sector 208 returns to its normal position striking against a stop pin 215 fastened on the actuating arm 172.

As the time correction disc 90 begins to rotate the nose portion 206 on arm 202 climbs out of the V-shaped recess 205 and upon encountering the high portion of time correction disc the clutch release pawl 201 biased in a counterclockwise direction returns to its home position against arm 114. When the time correction disc 90 has completed one revolution and returned to its home position the nose portion 206 on arm 114 drops into the recess 205 and the clutch release pawl 201 contacts the latch arm 200 of clutch piece 94 causing the clutch piece to pivot counterclockwise disengaging the clutch tooth 108 from the toothed periphery of the constantly rotating toothed disc 86. With latch piece 94 thus disengaged the drive between the time correction disc 90 and the constantly rotating disc 86 is removed and the minute hand is positioned at exactly the fifty-ninth minute.

It is to be noted that by virtue of the shape of the nose portion 206 on arm 114 and the V-shaped recess 205 that when the nose seats into the notch at the end of a correction cycle it will snap in quickly and positively at approximately a zero pressure angle. In other words, since the top edge of nose 206 and the top edge of recess 205 are radial to the disc 90 when in engagement with each other, there is no tendency for the engagement of the two to cause any additional movement to be imparted to the time correction disc 90 and consequently the minute hand. A feature of this improved clock correcting mechanism is the elimination of any forward creep of the minute hand at the end of a correction cycle.

In addition to the above-described improved hourly correction mechanism, means are provided for correcting the seconds hand at least once each minute. As was previously mentioned, this feature is particularly useful in radio or television studio clock installations where it is desired to have the seconds hands of the clocks accurately synchronized to control the switching of programs. As shown in Fig. 1, the actuating arm 172 has fastened thereto, by means of screws 216, a stop lever 217 which has an ear 218 on its extremity normally positioned in the path of the seconds stop arm 46 when magnet 150 is de-energized. In Fig. 1, the seconds stop arm 46 is shown in a position five seconds before the ear 218 on stop lever 217 which is the time that magnet 150 is energized to initiate a correction cycle for the minute and hour hands of the clock.

The energization of magnet 150 will cause the actuating arm 172 and stop lever 217 to pivot in a clockwise direction moving the ear 218 down out of the path of the seconds stop arm 46. Since magnet 150 is not de-energized until five seconds have elapsed the seconds stop arm 46 will be past the ear 218 and will not be stopped.

Now assuming that an hourly correction cycle has been made and the clock is rotating through the first minute of any particular hour, the seconds hand and seconds stop arm 46 will rotate at the rate of one and one-sixtieth revolutions per minute by virute of the one and one-sixtieth R. P. M. motor M. At the end of one revolution of the seconds hand the seconds stop arm 46 will strike the ear 218 on stop lever 217 thus stopping the seconds hand 12. Almost simultaneously a signal is transmitted to the secondary clock over the reqular power line at the termination of a minute of a standard time hour to energize the magnet 150 causing the stop lever 217 and ear 218 to be moved out of the path of the seconds stop arm 46 releasing it for further rotation. This impulse is repeated once each minute and is of a shorter duration (in this case less than five seconds) than the impulse used to energize the magnet 150 for an hourly correction cycle and consequently will not operate the time delay mechanism long enough to trip clutch release pawl 201. With the seconds hand rotating at the rate of one and one-sixtieth revolutions per minute for one complete revolution, then stopped at the end of that revolution for approximately one second and then released again by a minute impulse from a standard time source, it can be seen that the seconds hands of a plurality of secondary clocks may all be brought into synchronization once each minute.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a secondary clock mechanism, a rotatable seconds member, a rotatable minutes member, means normally rotating each of said members, a rotatable clock-advancing member, clutch means operative for connecting said clock-advancing member and seconds member in driving relationship for causing the former to rotate at the speed of the latter, a pawl member normally rendering said clutch means inoperative, a rotary cam for tripping said pawl member to permit said clutch means to become operative, an electromagnet responsive to the reception of a signal at a predetermined chronological time, an armature for said electromagnet, an actuating arm connected to said armature, a sector member pivotally connected to said actuating arm, said cam being connected to said sector member for rotation therewith, and said actuating arm being movable when said armature is attracted by the electromagnet to bring the sector member into operative engagement with said seconds member whereby said cam is actuated to trip said pawl member.

2. In a secondary clock mechanism, a rotatable seconds member, a rotatable minutes member, means normally rotating each of said members, a rotatable clock-advancing member, clutch means operative for connecting said clock-advancing member and second member in driving relationship for causing the former to rotate at the speed of the latter, a pawl member normally rendering said clutch means inoperative, a cam for tripping said pawl member to permit said clutch means to become operative, an electromagnet responsive to the reception of a signal of a predetermined duration, an armature for said electromagnet, an actuating arm connected to said armature, a sector member, means for clamping said cam to said sector member in a predetermined angular relationship therewith, means for pivotally mounting said cam and sector member to said actuating arm, said actuating arm being movable when said armature is attracted by the electromagnet to bring the sector member into operative engagement with said seconds member whereby said cam is actuated to trip said pawl member.

3. In a secondary clock mechanism, a rotatable seconds member, a rotatable minutes member, means normally rotating each of said members, a rotatable clock advancing means having a V-shaped notch in the periphery thereof, a one revolution clutch operative for connecting said clock advancing member and seconds member in driving relationship for causing the latter to rotate at the speed of the former, latching means normally rendering said clutch means inoperative, tripping means for unlatching said latching means to permit said clutch means to become operative, an electromagnet responsive to the reception of a time signal, means under control of said electromagnet when energized for operating said tripping means to permit said clock advancing means to make one revolution, a detent lever, a follower arm fastened on said detent lever and having a nose portion of substantially the same shape as said notch, said notch having a square shoulder for alignment with the nose portion of said follower arm, and means for biasing said detent lever to permit the nose portion of the follower arm to ride on the periphery of said clock-advancing means, said nose portion having a straight shoulder seating in the square shoulder of said V-shaped notch at the end of one revolution of said clock-advancing means at approximately a zero pressure angle permitting said latching means to render the one revolution clutch inoperative and detenting the clock-advancing means in its home position without imparting any additional movement thereto.

References Cited in the file of this patent

UNITED STATES PATENTS

| | | |
|---|---|---|
| 1,620,455 | Gains | Mar. 8, 1927 |
| 2,289,636 | Engel | July 14, 1942 |
| 2,569,815 | Larrabee | Oct. 2, 1951 |